No. 718,303. PATENTED JAN. 13, 1903.
L. T. BASSETT.
MOTOR VEHICLE.
APPLICATION FILED OCT. 10, 1902.
NO MODEL.
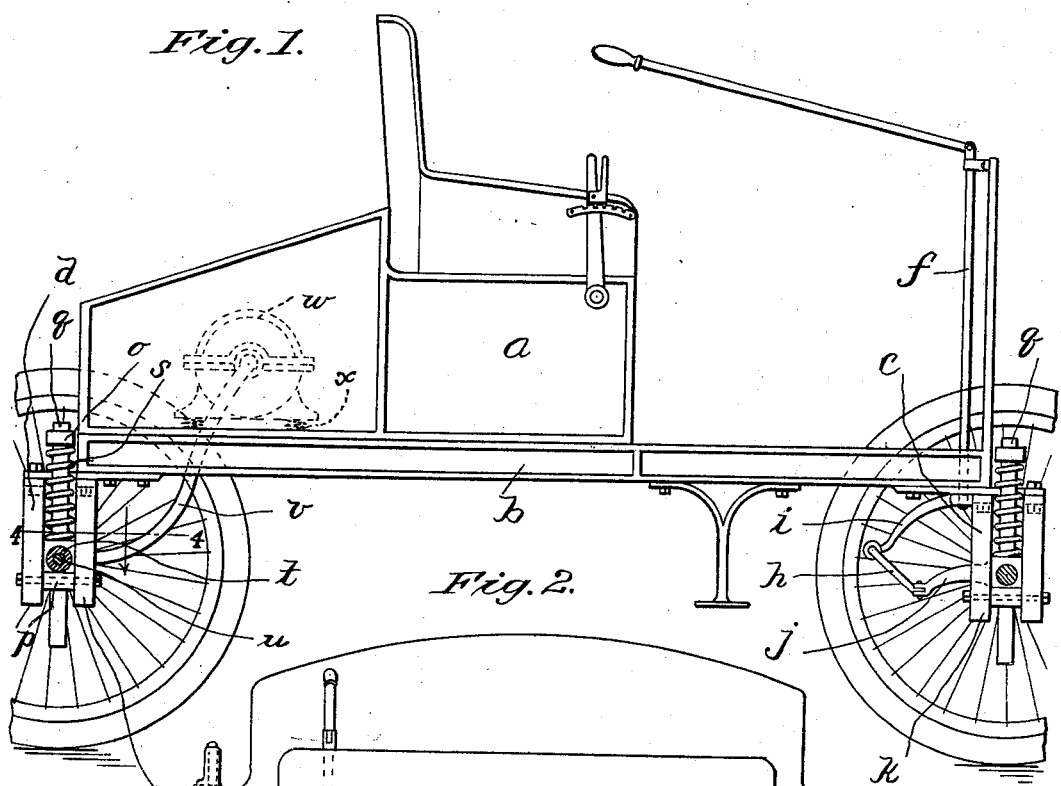
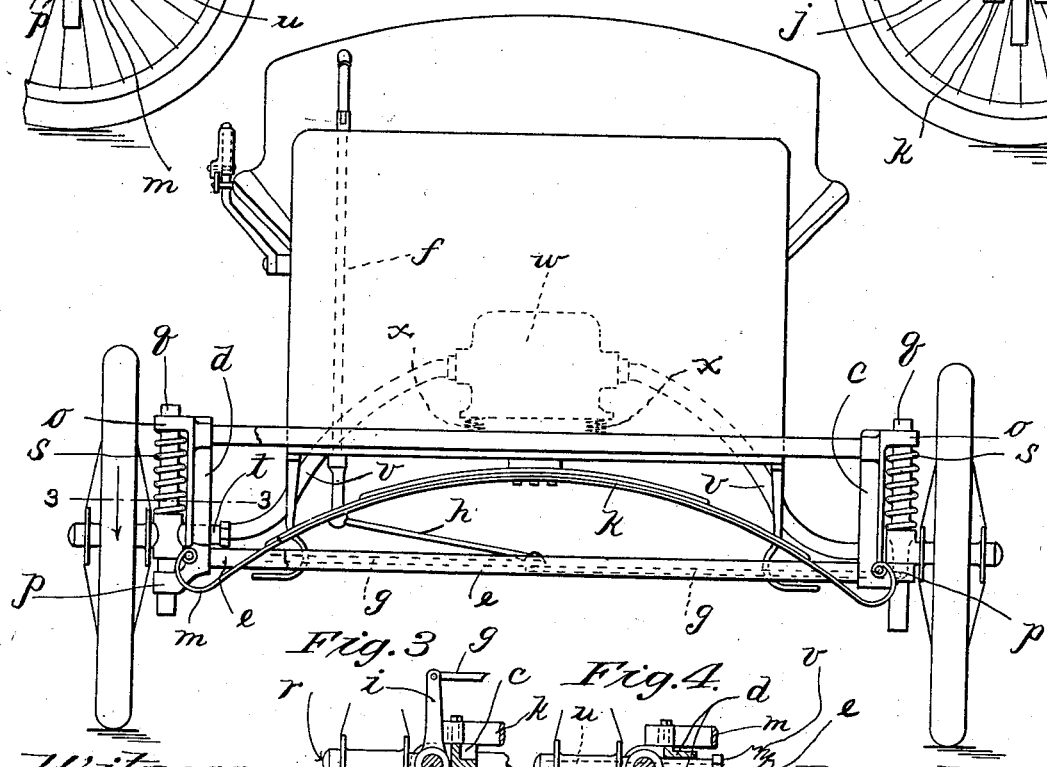
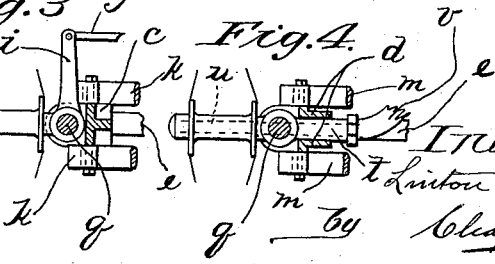
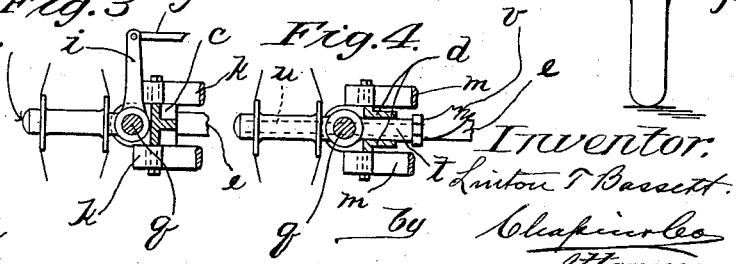

UNITED STATES PATENT OFFICE.

LINTON T. BASSETT, OF HOLYOKE, MASSACHUSETTS.

MOTOR-VEHICLE.

SPECIFICATION forming part of Letters Patent No. 718,303, dated January 13, 1903.

Application filed October 10, 1902. Serial No. 126,696. (No model.)

*To all whom it may concern:*

Be it known that I, LINTON T. BASSETT, a citizen of the United States of America, residing at Holyoke, in the county of Hampden and State of Massachusetts, have invented new and useful Improvements in Motor-Vehicles, of which the following is a specification.

This invention relates to automobile-vehicle constructions, the object of the invention being to improve the construction of self-propelled vehicles, the specific objects in view being to provide an improved frame of rigid construction spring-supported on the wheels, the body of the vehicle being spring-supported on the frame, the motor being supported within the body of the vehicle, and a flexible connection extending between the motor and the two driving-wheels of the vehicle, (preferably the rear wheels,) said flexible connection and the motor-shaft constituting, practically, the rear axle to the extent at least that it constitutes a driving connection between the driving-wheels.

In the drawings forming part of this application, Figure 1 is a side elevation of the vehicle embodying my improvements, the front and rear wheels on one side being removed. Fig. 2 is a front elevation of the vehicle, the forward wheel and one side of the vehicle being removed to bring the rear wheel and its connections into view. Fig. 3 is a sectional plan view through the front-wheel support on line 3 3, Fig. 2. Fig. 4 is a similar view taken on line 4 4, Fig. 1, through the rear-wheel support.

Referring now to the drawings, $a$ may indicate the vehicle-body; $b$, a rectangular frame; $c$, brackets to support the front wheels secured to the forward end of the frame $b$ at right angles thereto; $d\,d$, brackets to support the rear wheels, secured to the rear end of the frame $b$ at right angles thereto, these brackets preferably extending below the frame, as shown. Between the lower ends of the front and rear wheel brackets $c$ and $d$ there is located the rigid transverse truss-bar $e$; but no reach is provided between the front and rear brackets, as the connection between these brackets and the frame $b$ of the vehicle may be made sufficiently rigid to render it unnecessary, although one or more may, if desired, be used. The steering-post is indicated by $f$ and is provided with the usual handle, and mounted on the body of the vehicle and between a crank-arm on the lower end thereof and the cross-bars $g$ (shown in dotted lines in Fig. 2, a portion of one of them also being shown in Fig. 3) are the usual connecting-rods $h$, so applied to these bars $g$ as to permit freedom of vertical movement between the body of the vehicle and the bars $g$. These bars $g$ extend, as is customary in this class of vehicles, from the above-named crank-arm (indicated by $i$) to a rearwardly-extending arm $j$ on each front wheel, integral with the sleeve on which said wheels or the steering-wheels of the vehicle are mounted.

The vehicle-body $a$ is supported at opposite ends thereof on springs, (indicated by $k$ for the front axle and by $m$ for the rear axle,) the ends of which are secured to the lower ends of the wheel-brackets.

On opposite ends of each of the wheel-brackets $c$ and $d$ there are two ears, the upper one for each bracket being indicated by $o$ and the lower ones by $p$. These ears are horizontal and parallel, the lower being vertically in line with the upper one, and both are perforated to receive the posts $q$. These posts have a similar function and being substantially similar in construction are all indicated by the same letter for the front and rear axle. The wheel-supports, however, for the front and rear wheels are different. Those at the front, on which the steering-wheels are mounted, consist in a forging having thereon a short shaft, (indicated by $r$,) on which the front wheels are mounted, and another arm, which is substantially at right angles thereto, which is lettered $i$, which is the steering-arm to which the cross-bars $g$ are secured. At the junction of these two arms a hub is formed, which is drilled through to permit it to be fitted over the post $q$, the latter being supported by the ears $o$ and $p$, and between the upper end of this hub and the ear $o$ a coiled spring $s$ is interposed, to the end that the weight of the frame and the vehicle-body may be supported on these springs. Preferably the posts $q$ of the forward wheels are secured in the ears of their supporting-brackets, and the wheel-supports move vertically on these posts. If desired, however, these forward-wheel supports may be secured to these posts $q$ and the latter be left free to play vertically in their brackets. The rear-wheel supports and posts are integral, however, as will be described farther on. From the foregoing description it is evident that the forward or steering wheels of the vehicle may swing on a vertical axis and be controlled in their swinging movements by the steering device. The rear-wheel supports, however, are of a different construction, it being requisite that these rear wheels, while movable vertically, should be held rigidly in parallelism with the sides of the frame, and to that end, while the bracket $c$ on which the forward wheels are mounted may be made in one piece, as shown in the sectional view thereof in Fig. 3, the bracket $d$ of the rear wheels must be so constructed as to permit the passage therethrough of a sleeve $t$, within which is located a short wheel-shaft $u$, rotatable in said sleeve and shown in dotted lines in Fig. 4. This sleeve must move vertically in said bracket, and to that end the rear-wheel brackets are preferably made of two pieces of L-iron, as shown in sectional view in Fig. 4, being supported in parallelism one with the other and rigidly united at their ends by the ears $o$ and $p$, through which the post $q$ extends. This post $q$ and the sleeve $t$ are made in one piece, the post $q$ being movable in the bracket vertically, and a spring $s$ is interposed between the ear $o$ and the upper end of the hub. From the latter said sleeve $t$ extends at right angles. The sleeve $t$ may be squared off on the sides thereof which bear on the bracket, or a shoe may be interposed between the sleeve and the bracket, as is frequently done in similar constructions.

The rear wheels are fixedly secured on the short shafts $u$, and from the inner ends of each of the latter a flexible shaft $v$ extends to and is connected with the opposite ends of a motor-shaft. In the drawings the motor is shown only in dotted lines and is represented only in a conventional manner, being indicated by $w$.

The flexible shafts may be of any desired construction, and those shafts and the motor constitute the only connection between the two rear wheels, there being, in effect, no rear axle. The flexible connection between the motor, which is carried in the body of the vehicle, and the rear wheels, which are mounted on the frame, permit the necessary vertical movements between the wheels and the body to take place.

While in the drawings the flexible shaft has been shown as running directly to the axis of a rotary motor, it is of course to be understood that if another form of motor be used this connection may be made through some secondary shaft thereof as desired or to some counter-shaft with which the motor is connected. The preferred manner of mounting the motor upon the frame is to support it on springs $x$, as indicated in Figs. 1 and 2, whereby the vibrations thereof will be less liable to be imparted to the body.

From the foregoing description it is seen that while the motor is mounted in the body of the vehicle and drives directly onto the rear wheels, which are mounted in the frame, both the body and the wheels may be moved simultaneously in different directions without disarrangement to the driving mechanism. Furthermore, the frame being independently spring-supported on the wheels and the body being independently spring-supported on the frame the construction results in a very easy movement of the vehicle-body, as the vibration usually imparted thereto through the wheels is very much reduced by the interposed wheel-springs $s$ and body-springs $k$ and the motor-springs $x$.

Having thus described my invention, what I claim, and desire to secure by Letters Patent of the United States, is—

1. A motor-vehicle comprising a frame, wheel-supporting brackets rigidly attached to the forward and rear ends thereof, a wheel mounted in each bracket, each wheel being capable of independent vertical movements; and a flexible shaft connected by one end to the axis of certain of the wheels, and means for connecting the opposite end of the shaft with a motor.

2. A motor-vehicle comprising a frame, wheel-supported brackets rigidly attached to the forward and rear ends thereof, a wheel independently movable in a vertical plane, mounted in each bracket, means for oscillating each wheel on one end of the frame about a vertical axis, and a flexible shaft connected by one end to the axis of certain of the wheels, and means for connecting the opposite end of the shaft to a motor.

3. A motor-vehicle comprising substantially a rectangular frame, driving-wheels supported thereon capable of independent vertical movements, suitable springs for said wheels between the latter and the frame for supporting said frame, a body, and springs between the body and the frame for supporting the body, a motor in said body, and a flexible driving-shaft extending between the driving-wheels and the motor, whereby the wheels are rotated, together with suitable steering-wheels for the vehicle.

4. A motor-vehicle comprising a frame, means for supporting wheels on the forward and rear ends thereof, the wheels or wheel on one end being capable of swinging movements about a vertical axis, and capable of vertical movements on said axis, and the wheels on the opposite end of the frame being capable of independent vertical movements, combined with a suitable motor, and a flexible driving-shaft connected by one end to the last-named wheel, and by its opposite end to said motor.

5. A motor-vehicle comprising a substantially rectangular frame, driving-wheels supported thereon, a body spring-supported on the frame, a motor in said body, springs for supporting said motor, and a flexible shaft whose ends are respectively connected with the axis of said wheels and with said motor, and a suitable steering-wheel for the vehicle.

LINTON T. BASSETT.

Witnesses:
WM. H. CHAPIN,
K. I. CLEMONS.